US010838270B2

United States Patent
Kim

(10) Patent No.: US 10,838,270 B2
(45) Date of Patent: Nov. 17, 2020

(54) LIQUID CRYSTAL DISPLAY DEVICE

(71) Applicant: LG Display Co., Ltd., Seoul (KR)

(72) Inventor: Jin-Sam Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/707,350

(22) Filed: Dec. 9, 2019

(65) Prior Publication Data
US 2020/0209692 A1    Jul. 2, 2020

(30) Foreign Application Priority Data

Dec. 31, 2018 (KR) .......................... 10-2018-0173614

(51) Int. Cl.
| G02F 1/1343 | (2006.01) |
| G02F 1/1362 | (2006.01) |
| G02F 1/1335 | (2006.01) |
| G02F 1/1368 | (2006.01) |

(52) U.S. Cl.
CPC ...... *G02F 1/134363* (2013.01); *G02F 1/1368* (2013.01); *G02F 1/133512* (2013.01); *G02F 1/136286* (2013.01); *G02F 2001/134318* (2013.01)

(58) Field of Classification Search
None
See application file for complete search history.

(56) References Cited

U.S. PATENT DOCUMENTS

| 8,368,630 B2 | 2/2013 | Lee et al. |
| 2014/0340622 A1* | 11/2014 | Ono ................... G02F 1/136227 349/138 |
| 2017/0108745 A1* | 4/2017 | Jia ......................... H01L 27/124 |

FOREIGN PATENT DOCUMENTS

| CN | 105159001 A | 12/2015 |
| KR | 10-2010-0048264 A | 5/2010 |
| KR | 10-2018-0028821 A | 3/2018 |
| KR | 10-2018-0077377 A | 7/2018 |

OTHER PUBLICATIONS

Office Action issued in corresponding Korean Patent Application No. 10-2018-0173614 dated Oct. 11, 2019.
Extended European Search Report issued in corresponding European Patent Application No. 19177221.9 dated Sep. 12, 2019.
Office Action issued in corresponding TW Patent Application No. 108144966 dated Jul. 29, 2020. Note: US 2014/0340622 cited therein is already of record.

* cited by examiner

*Primary Examiner* — Phu Vu
(74) *Attorney, Agent, or Firm* — Morgan, Lewis & Bockius LLP

(57) ABSTRACT

A liquid crystal display device includes additional common electrode patterns to shield data lines and common lines and, thus, to avoid undesired fringe fields. The liquid crystal display device prevents crosstalk and enhances visibility.

15 Claims, 7 Drawing Sheets

LIQUID CRYSTAL DISPLAY DEVICE

This application claims the benefit of Korean Patent Application No. P 10-2018-0173614 filed on Dec. 31, 2018, which is hereby incorporated by reference as if fully set forth herein.

BACKGROUND

Technical Field

The present disclosure relates to a display device, and more particularly, to a liquid crystal display device for preventing data coupling in the active area and crosstalk in a vertical direction to enhance visibility.

Discussion of the Related Art

Along with the development of the information age, demands for display devices have increased in various forms. To meet this, research has been conducted on various display devices such as a liquid crystal display device (LCD), an organic light emitting display device (OLED), a plasma display panel (PDP), an electro luminescent display (ELD), and a vacuum fluorescent display (VFD), and some of these have been already applied in various devices.

Among those display devices, recently, the liquid crystal display device (LCD) and the organic light emitting display device (OLED) have an advantage of being lightweight, short, and small and a vivid color, and have been developed to meet the user needs.

The above display device includes a thin film transistor array substrate including thin film transistors as switching devices that are commonly formed in every pixel region. On the thin film transistor array substrate, a thin film transistor is formed at an intersection between each gate line and a data line along with a plurality of gate lines and data lines that cross each other. Here, a pad portion connected to each line is connected to a printed circuit board for transmitting an electrical signal on a portion of an edge of the thin film transistor array substrate in order to apply a signal to the gate lines and the data lines.

A related art display device is configured in such a way that an edge of a display surface is surrounded by a mechanism and internal components are hidden to be invisible.

The liquid crystal display device is classified into a vertical alignment mode device and an in-plane switching mode device according to a shape of an electric field applied between a pixel electrode and a common electrode, which are included in the liquid crystal display device. For use in a wide viewing angle, the in-plane switching mode has been discussed.

However, in the liquid crystal display device using the in-plane switching mode, a common electrode that has a large area for a high aperture ratio inevitably overlaps other electrodes or wirings, and thus, there is a problem in that crosstalk occurs due to overlap with other wirings as well as, an in-plane switching mode, with a pixel electrode.

SUMMARY

Accordingly, embodiments of the present disclosure are directed to a liquid crystal display device that substantially obviates one or more of the problems due to limitations and disadvantages of the related art.

An object of the present invention is to provide a liquid crystal display device which changes shapes of overlapping common electrodes to prevent light leakage (caused by undesired fringe fields) above a data line, for preventing strong crosstalk in one direction and for enhancing visibility.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device comprises a second common electrode which covers the data line. Connection with a common line to which a common voltage is applied may maintain a potential of the second common electrode at a constant common voltage value, thereby preventing crosstalk and enhancing visibility.

The liquid crystal display device includes a substrate and a plurality of pixels arranged in horizontal pixel rows on the substrate. Each pixel row comprises a first common electrode. At least one gate line is disposed between the first common electrode of the first pixel row and the first common electrode of the second pixel row. A plurality of alternating data lines and common lines are spaced from each other and cross the at least one gate line to define the plurality of pixels in each horizontal pixel row. Each pixel comprises a plurality of pixel electrodes. Each pixel comprises a second common electrode including a first common electrode pattern and a second common electrode pattern that overlap the data line and the common line, respectively, of the pixel. The second common electrode of each pixel in the first pixel row is connected, through an intersection connector, to the second common electrode of a neighboring pixel in the second pixel row. Each pixel may comprise a horizontal connector that interconnects the first and second common electrode patterns of the pixel.

The second common electrodes of a pixel in the first pixel row may be symmetrical to the second common electrode of a neighboring pixel in the second pixel row in a diagonal direction with respect to the common line that passes through those pixels.

The intersection connector may connect the second common electrodes symmetrical to each other in a diagonal direction between the neighboring horizontal pixel rows.

The second common electrodes and the intersection connector may be disposed on the same layer.

The second common electrodes may be repeatedly disposed in a U shape or in an inverted U shape in the same horizontal pixel row.

The horizontal connector may extend between the data line and the common line of a pixel and may be positioned at only one of an upper side and a lower side of the pixel in the horizontal pixel row.

A connector between the common line and the intersection connector may be configured at a portion at which the intersection connector and the common line overlap each other.

A first type of gate line pairs may be configured between the first horizontal pixel row and the second horizontal pixel row, and a second type of gate line pairs may be configured between the second horizontal pixel row and a next horizontal pixel row.

The liquid crystal display device may further include a first thin film transistor for driving a pixel region that is spaced apart from the data line by one pixel region in the first horizontal pixel row, and a second thin film transistor in the second horizontal pixel row, the first thin film transistor and the second thin film transistor crossing the data line with respect to the first type gate line pairs, and a third thin film transistor for driving a pixel region of the second horizontal pixel row that contacts the data line, and a fourth thin film transistor for driving a pixel region of the next first horizontal pixel row that contacts the data line, the third thin film transistor and the fourth thin film transistor crossing the data line with respect to the second type gate line pairs.

The liquid crystal display device may further include a second substrate opposing the first substrate, and a liquid crystal layer between the first and second substrates.

Light passing through the liquid crystal layer may be emitted through the first substrate, and the second common electrode may be closer to the liquid crystal layer than the data line and the common line.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
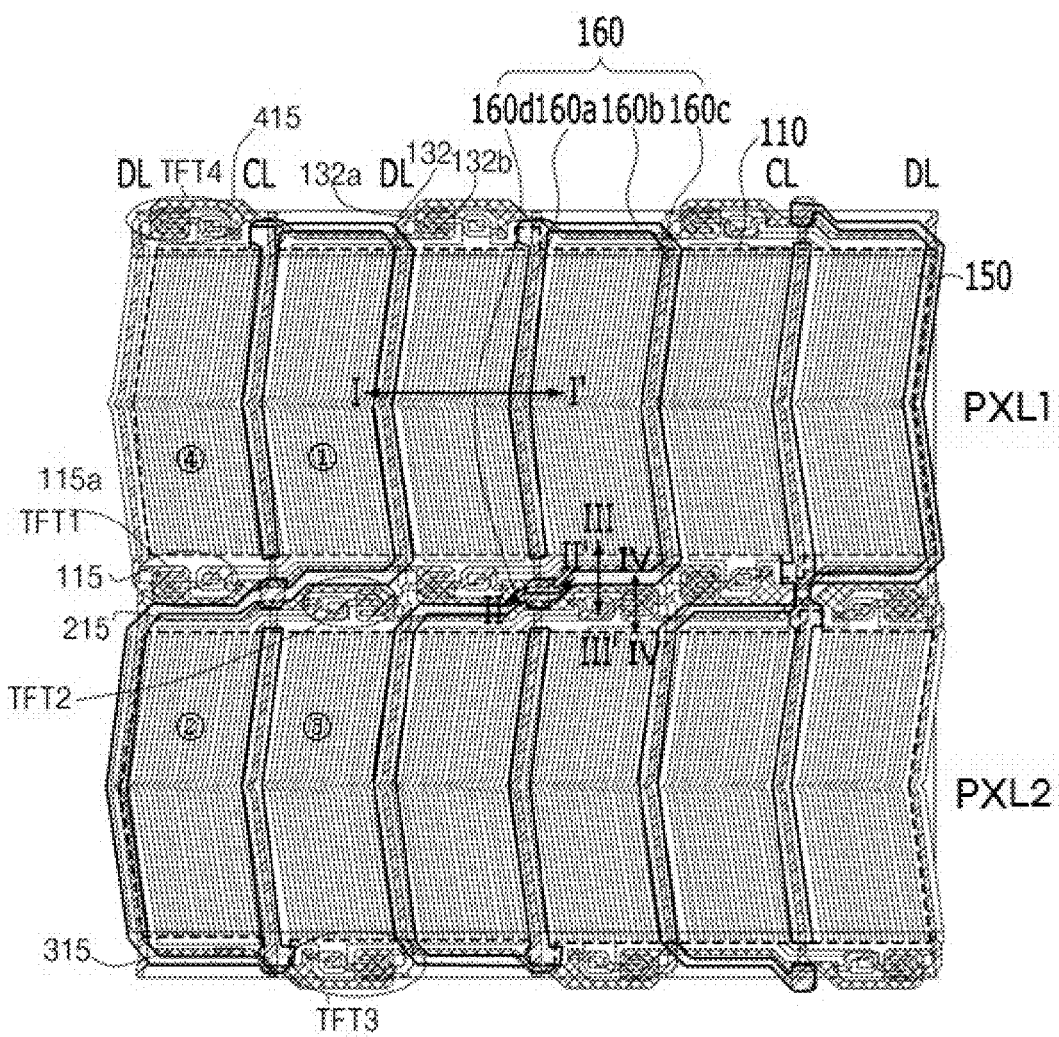
FIG. 1 is a plan view showing a liquid crystal display device according to an example embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention unclear. In addition, the terms of components used in the detailed description are selected in consideration of ease of description of the specification and may be different from the terms of components of an actual product.

The shapes, sizes, ratios, angles, numbers and the like disclosed in the drawings for description of various embodiments of the present invention to describe embodiments of the present invention are merely exemplary and the present invention is not limited thereto. Like reference numerals refer to like elements throughout the specification. In the following description of the present invention, a detailed description of known related art will be omitted when it is determined that the subject matter of the present invention may be unnecessarily obscured. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present invention are to be interpreted as including margins of error even without explicit statements.

With regard to the following description of the present invention, in describing positional relationships, phrases such as "an element A on an element B", "an element A above an element B," "an element A below an element B" and "an element A next to an element B," another element C may be disposed between the elements A and B unless the term "immediately" or "directly" is explicitly used.

With regard to the following description of the present invention, in describing temporal relationships, e.g., terms such as "after", "subsequently", "subsequent to", and "before", the terms may include a discontinuous case unless the term "immediately" or "directly" is explicitly used.

With regard to the following description of the present invention, in describing elements, terms such as "first" and "second" are used, but the elements are not limited by these terms. These terms are simply used to distinguish one element from another. Accordingly, as used herein, a first element may be a second element within the technical idea of the present invention.

With regard to the following description of the present invention, features of various exemplary embodiments of the present invention may be partially or fully combined. As will be clearly appreciated by those skilled in the art, various interactions and operations are technically possible. Various exemplary embodiments can be practiced individually or in combination.

Figure 2A:
FIG. 2A is a plan view showing gate lines and gate electrodes of FIG. 1.
Figure 2A:
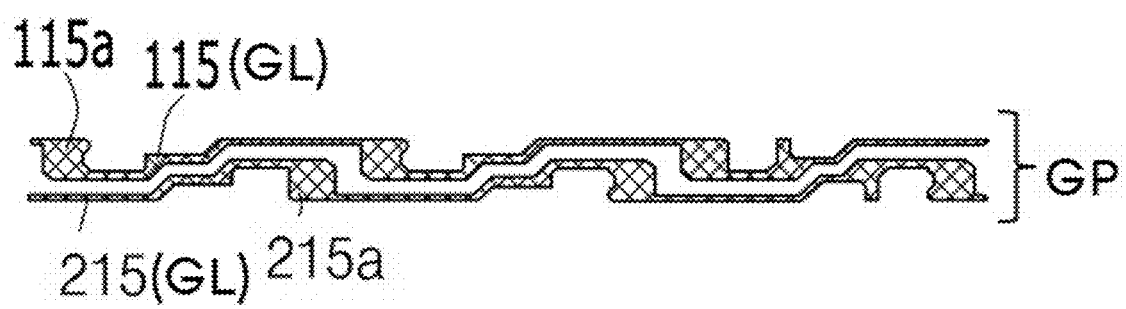
Figure 2A:
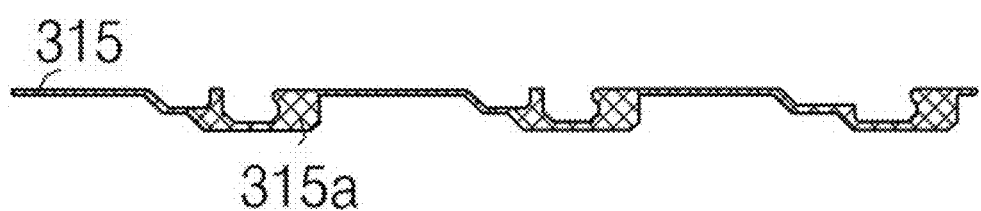
Figure 2B:
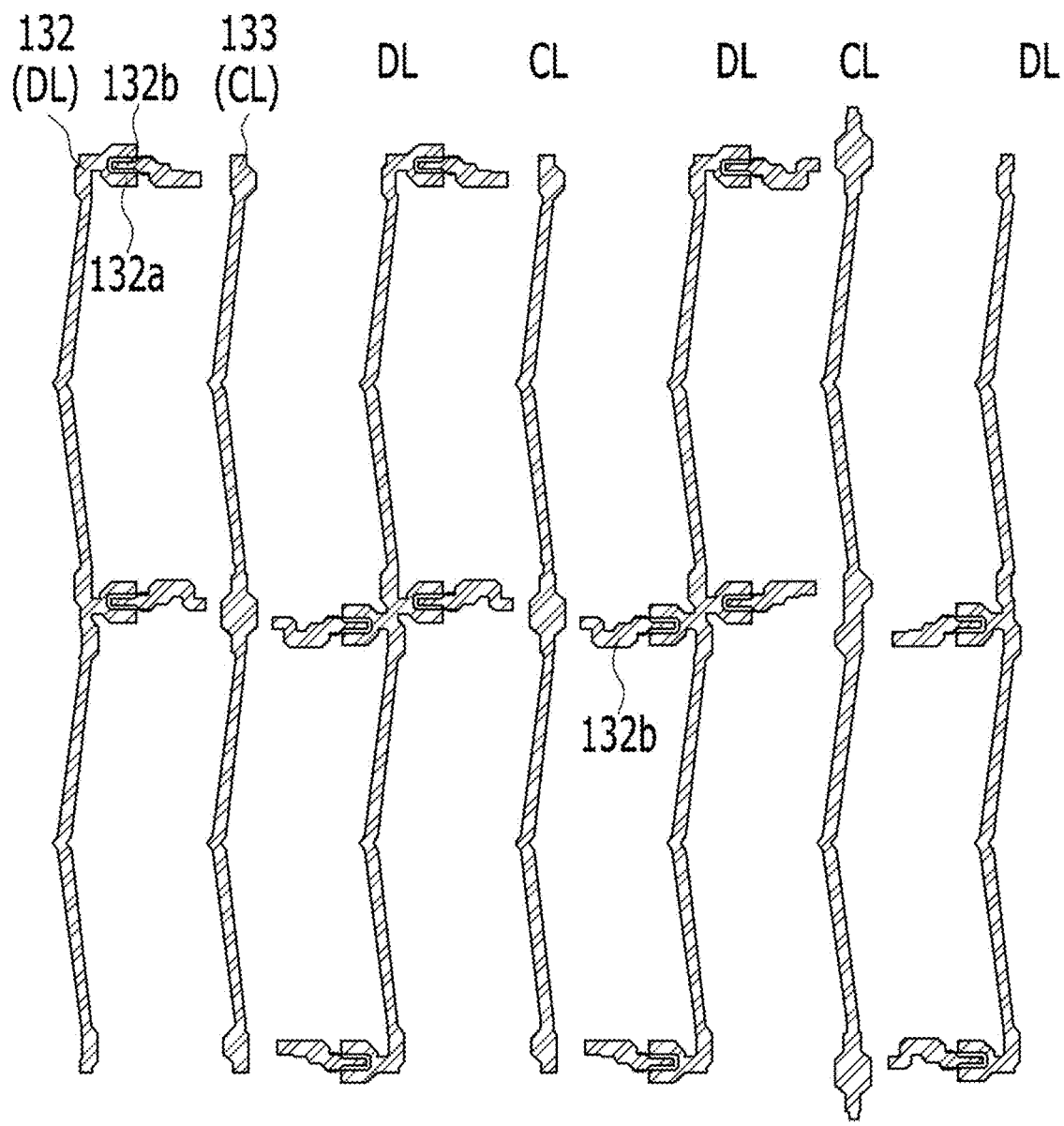
FIG. 2B is a plan view showing data lines, common lines and components at the same layer level as the data line of FIG. 1.
Figure 2C:
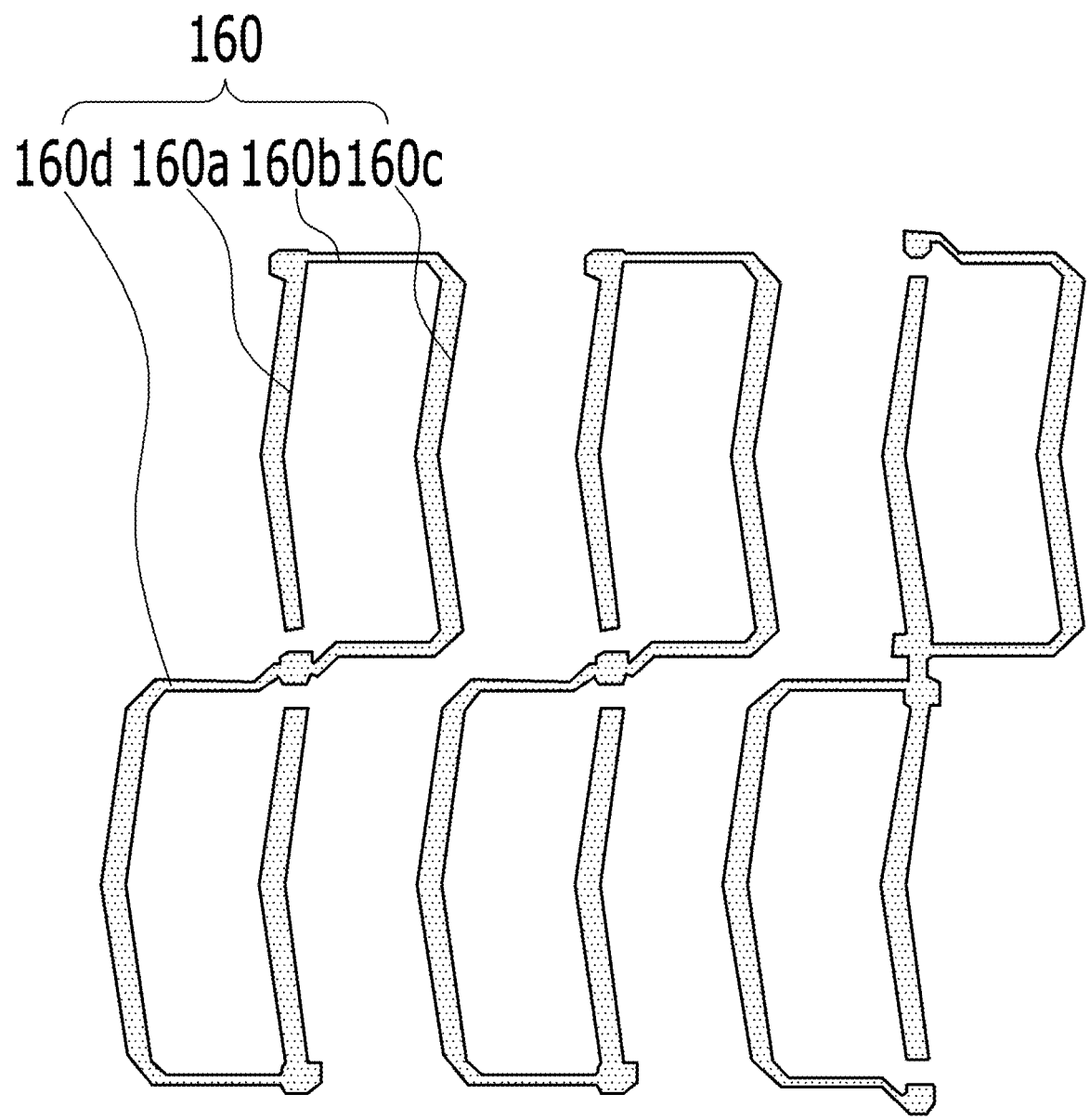
FIG. 2C is a plan view showing second common electrode of FIG. 1.
Figure 3:
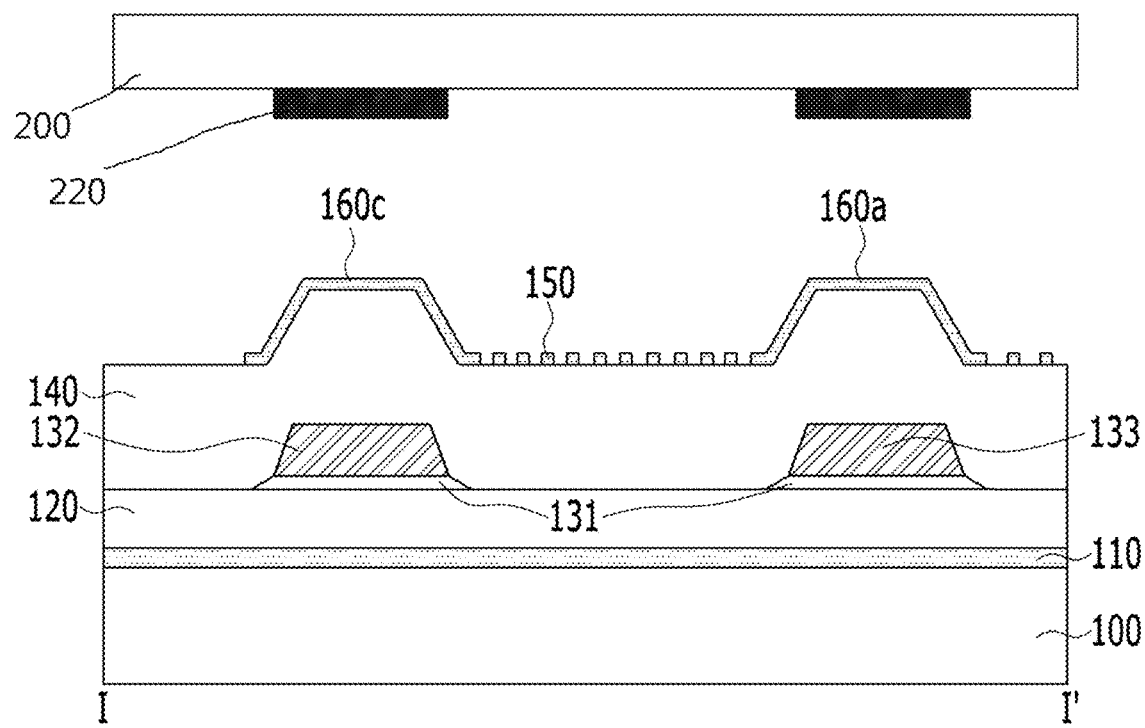
FIG. 3 is a cross-sectional view taken along line I-I' of FIG. 1.
Figure 4:
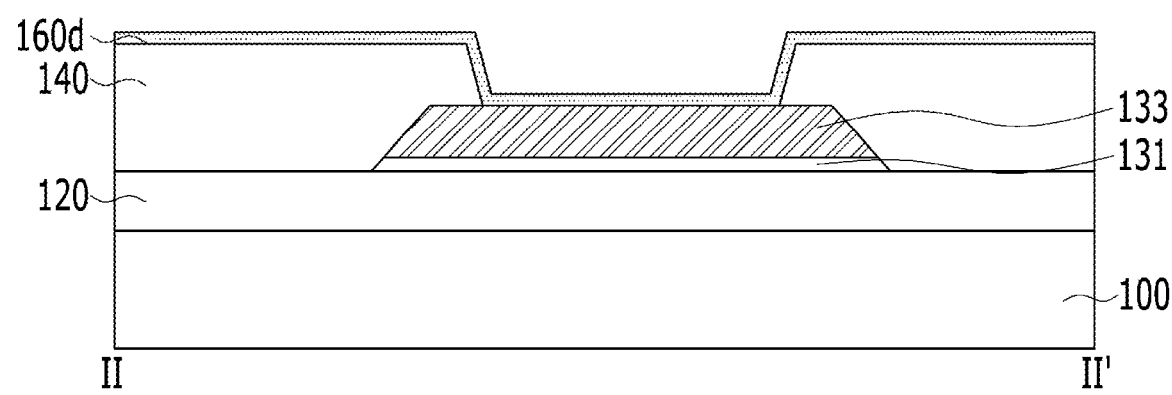
FIG. 4 is a cross-sectional view taken along line II-II' of FIG. 1.
Figure 5:
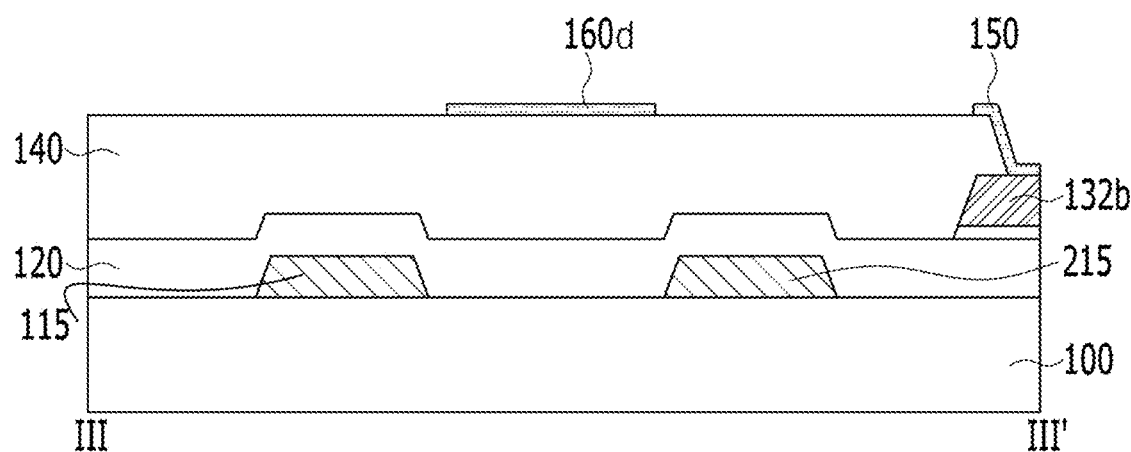
FIG. 5 is a cross-sectional view taken along line III-III' of FIG. 1.
Figure 6:
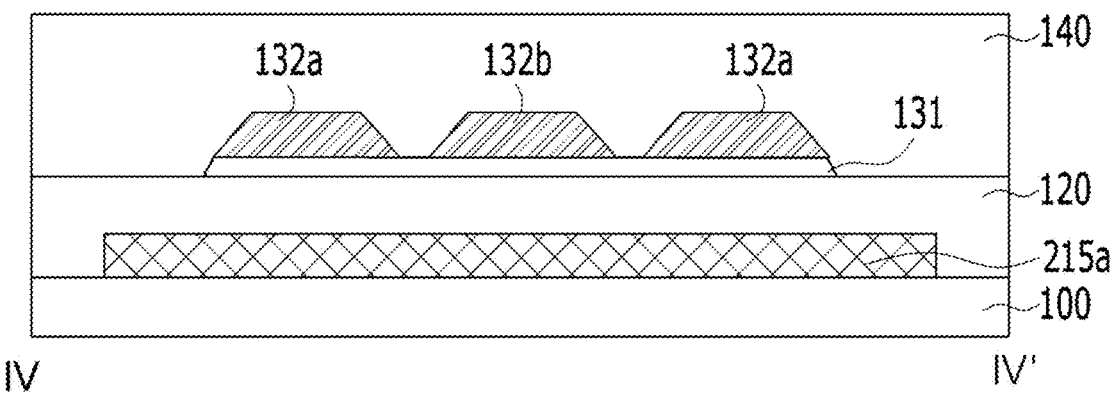
FIG. 6 is a cross-sectional view taken along line IV-IV' of FIG. 1.

FIG. 1 is a plan view showing a liquid crystal display device according to an example embodiment of the present invention. FIG. 2A is a plan view showing a gate lines and gate electrodes of FIG. 1. FIG. 2B is a plan view showing data lines, common lines and components at the same layer level as the data line of FIG. 1. FIG. 2C is a plan view showing second common electrodes of FIG. 1. FIG. 3 is a cross-sectional view taken along line I-I' of FIG. 1. FIG. 4 is a cross-sectional view taken along line II-II' of FIG. 1. FIG. 5 is a cross-sectional view taken along line III-III' of FIG. 1. FIG. 6 is a cross-sectional view taken along line IV-IV' of FIG. 1.

As shown in FIGS. 1 to 6, the liquid crystal display device according to the present invention may include first common electrodes 110 that are spaced apart from each other to correspond to a plurality of horizontal pixel rows and are each configured in a plate type on a first substrate 100. The liquid crystal display device further includes a plurality of gate line pairs GP having a first gate line 115 and a second gate line 215 that are disposed between the first common electrodes 110, a plurality of data lines 132 and common lines 133 that are spaced apart from each other and are alternately disposed to have a plurality of pixel regions in the horizontal pixel row that cross the gate line pairs which are disposed at an upper and a lower region of the horizontal pixel row, and a plurality of pixel electrodes 150 in the pixel region. The pixel electrodes 150 are integral in each pixel region and are branched as a finger shape.

Second common electrodes 160 each include a first common electrode pattern 160c and a second common electrode pattern 160a that overlap the data line 132 and the common line 133, respectively, in the horizontal pixel row, and a horizontal connector 160b that connects the first and second common electrode patterns that are adjacent to each other. As each of the second common electrodes 160 overlaps each of the data lines 132 in each horizontal pixel row, unintended horizontal electric field between the pixel electrodes 150 and the data line 132 is shielded. If the second common electrode 160 is not positioned above the data line 132, unintended horizontal electric field between the data line 132 and adjacent pixel electrode 150 may be generated, then light leakage due to distortion of liquid crystal around the data line 132 caused from unintended horizontal electric field may be shown. In the present application, overlapping between the second common electrodes 160 and the data line 132 is separated and divided in units of horizontal pixel rows, and thus overlapping configuration between the second common electrode 160 and the data line 132 is not longitudinally continuous in a direction of data line 132. Therefore, such overlapping configuration separate in units of horizontal pixel rows prevents a phenomenon whereby electric potential of the second common electrode is changed in conjunction with a voltage value of the data line 132 to cause vertical crosstalk.

Shapes of the second common electrodes 160 that are separated for respective adjacent horizontal pixel rows may be symmetrical to each other in a diagonal direction with respect to the common line 133. This is because voltages of the second common electrodes 160 need to be prevented from being changed according to the same tendency for respective horizontal pixel rows via repetition of the same pattern.

In addition, the second common electrodes 160 may each further include an intersection connector 160d for connecting the second common electrodes symmetrical to each other in a diagonal direction between the adjacent horizontal pixel rows. This is because continuity of a common voltage applied to upper and lower horizontal pixel rows needs to be ensured. The first and second common electrode patterns 160c and 160a, the horizontal connector 160b thereof, and the intersection connector 160d may be patterns that are integrated with each other on the same layer.

The first and second common electrode patterns 160c and 160a, the horizontal connector 160b thereof, and the intersection connector 160d may be collectively referred to as the second common electrode 160. The second common electrode 160 may be positioned on a different layer from the first common electrode 110 and may be formed as a transparent electrode formed of the same or similar material to that of the first common electrode 110. The transparent electrode may be indium tin oxide (ITO), indium zinc oxide (IZO), or indium tin zinc oxide (ITZO).

As shown in FIG. 2C, the first common electrode pattern 160c, the horizontal connector 160b, and the second common electrode pattern 160a that are continuously configured on each horizontal pixel row may be repeatedly disposed in an inverted 'U' shape in a first horizontal pixel row PXL1 and may be repeated in a 'U' shape in a second horizontal pixel row PXL2. The first horizontal pixel row PXL1 may be an odd-numbered horizontal pixel row, and the second horizontal pixel row PXL2 may be an even-numbered horizontal pixel row. Alternatively, on the other hand, the first horizontal pixel row PXL1 may be an even-numbered horizontal pixel row, and the second horizontal pixel row PXL2 may be an odd-numbered horizontal pixel row.

In terms of the same horizontal pixel row, the data line 132 and the common line 133 that are adjacent to each other and have the horizontal connector 160b may have the horizontal connector 160b either above or below the same horizontal pixel row and may be spaced apart from each other at the other side. This is because continuous arrangement of the second common electrodes 160 in a horizontal direction needs to be prevented and lines in a horizontal direction need to be prevented from interfering with each other.

The first common electrode 110 may be configured in a plate type and may not continuously overlap with the gate line pairs GP to prevent signal interference with a gate line. The first common electrode 110 may include an extension portion and may be electrically connected to the common line 133 in a non-active area NA. The common line 133 may further include an electrical connector with the intersection connector 160d, and a common voltage signal from common lines in respective horizontal pixel rows may be applied.

A connector (which corresponds to a region indicated by II-II' of FIG. 1) between the common line 133 and the intersection connector 160d may be configured at a portion at which the intersection connector 160d and the common line 133 overlap each other.

In more detail, the horizontal pixel row may be configured in such a way that a first horizontal pixel row (a first region indicated by dotted lines of FIG. 1) and a second horizontal pixel row (a second region indicated by dotted lines of FIG. 1) that include second common electrodes adjacent to each other and are symmetrical to each other in a diagonal direction are alternately and repeatedly disposed, and the intersection connector 160d may have a first intersection connector 160d (in a diagonal direction from top right to bottom left) in a first diagonal direction between the first horizontal pixel and the second horizontal pixel row and a second intersection connector (in a diagonal direction from top left to bottom right at a lower end portion of a second line indicated by dotted lines) in a direction that crosses the first diagonal direction between the second horizontal pixel row (a second region indicated by dotted lines of FIG. 1) and a next first horizontal pixel row.

First type gate line pairs 115 and 215 may be configured between the first horizontal pixel row and the second horizontal pixel row, and second type gate line pairs 315 and 415 may be configured between the second horizontal pixel row and a next first horizontal pixel row.

The liquid crystal display device may further include a first thin film transistor TFT1 for driving a pixel region ① that is spaced apart from the data line 132 of the first horizontal pixel row by one pixel region in the right direction, and a second thin film transistor TFT2 for driving a pixel region ② that is spaced apart from the data line 132 of the second horizontal pixel row by one pixel region in the left direction, and here, the first thin film transistor TFT1 and the second thin film transistor TFT2 cross the data line 132 with respect to the first type gate line pairs 115 and 215.

The liquid crystal display device may further include a third thin film transistor TFT3 for driving a pixel region ③ of the second horizontal pixel row that contacts the data line 132 in the left direction, and a fourth thin film transistor TFT4 for driving a pixel region ④ of the first horizontal pixel row that contacts the data line in the first horizontal pixel row in the right direction, which cross the data line 132 with respect to the second type gate line pairs 315 and 415.

A pixel region may be defined between the gate lines 115, 215, 315, and 415, the data line 132 and the common lines 133, and according to the present invention, as a double reduced driving (DRD) structure for halving and applying a data voltage, the plurality of data lines 132 may be repeatedly disposed between two pixel regions in a horizontal direction, and the common line 133 may be repeatedly disposed with one pixel region interposed between the data line 132 and the adjacent common line 133 on the same layer.

According to the present invention, the second common electrode 160 may be disposed on the data line 132, and may prevent an unintended horizontal electric field between the data line 132 and the adjacent pixel electrode 150 that are adjacent to each other in a horizontal direction. Thus, a disclination line around the data line 132 may be prevented. Accordingly, as shown in FIG. 3, the width of a black matrix 220 that is included in a second substrate 200 to correspond to an upper portion of the data line 132 may be reduced to be equal to or less than the width of the data line 132.

The common line 133 may be connected to the intersection connector 160d with an interlayer insulating layer 140 interposed therebetween at a connector. The liquid crystal display device may further include a semiconductor layer 131 below the common line 133 and the data line 132. The semiconductor layer 131 may be formed as such when the data line 132 and the semiconductor layer 131 are formed using the same mask, and when the data line 132 and the semiconductor layer 131 are formed using respective masks, the semiconductor layer 131 may be omitted below the common line 133 and the data line 132.

The configuration of the second thin film transistor TFT2 is now described with reference to FIG. 6. The liquid crystal display device may further include a gate electrode 215a, the semiconductor layer 131 that overlaps the gate insulating layer 120 and has the gate insulating layer 120 interposed between the gate electrode 215a and the semiconductor layer 131, and a source electrode 132a and a drain electrode 132b which are connected to the semiconductor layer 131 except for a channel region of the semiconductor layer 131.

Hereinafter, a method of manufacturing a liquid crystal display device according to the present invention will be described with reference to FIGS. 1 to 6.

Referring to FIGS. 1 to 6, a transparent conductive material may be formed on the first substrate 100 and may be selectively removed to form the first common electrodes 110 that cross respective horizontal pixel rows.

Then, a light-reflecting metal material may be deposited and may be selectively removed to form the gate lines 115, 215, 315, and 415 in a horizontal line direction, and gate electrodes 115a, 215a, 315a, and 415a, which are integrated with the gate lines 115, 215, 315, and 415 and have a predetermined width, in the active area AA. Simultaneously, a pad electrode 325 (refer to FIG. 7) may be formed of the same material as the light-reflecting metal material to be adjacent to at least one side of the active area AA, i.e., horizontal pixel rows, in the non-active area NA. The pad electrode 325 may be connected to one side of the first common electrode 110.

Then, a gate insulating layer 120 may be formed on an entire surface of the first substrate 100.

Then, a semiconductor layer material (which is the same layer as the semiconductor layer 131) and a light-reflecting metal material (which is the same layer as the data line 132) may be sequentially stacked, and then, may be selectively removed to leave the data line 132 in a direction that crosses the gate electrodes 115a, 215a, 315a, and 415a, and patterns (which are portions for forming the source electrode 132a and the drain electrode 132b) that are formed in a shape of the semiconductor layer 131 of a thin film transistor to be integrated with the data line 132 and overlap the gate electrodes 115a, 215a, 315a, and 415a. As shown in the drawings, to reduce the number of applied data voltage level, the data line (DL) 132 and a common line (CL) 133 may be alternately formed on the same layer, as described above.

The light-reflecting metal material may be selectively removed at a portion corresponding to a channel region at an intersection with the gate electrodes 115a, 215a, 315a, and 415a to expose a channel portion of the semiconductor layer 131. During this procedure, the source electrode 132a in an integrated type, e.g., a 'C' shape (refer to FIG. 1) and the drain electrode 132b configured to have a channel region inside the source electrode 132a in a 'C' shape may be formed on the same layer as the data line 132. The drain electrode 132b may have one side that partially protrudes toward an internal portion of the 'C' shape of the source electrode 132a and extends toward the gate line 115.

Then, the interlayer insulating layer 140 may be formed on the gate insulating layer 120 to cover the data line 132, the source electrode 132a, and the drain electrode 132b.

Then, a transparent conductive material may be deposited and may be selectively removed to form the plurality of branched pixel electrodes 150 that are connected to the drain electrode 132b in a pixel region that is defined as a space between the gate line 115 and the data line 132. The first common electrode pattern 160c that overlaps the data line 132, the second common electrode pattern 160a that overlaps the common line 133, the horizontal connector 160b for connecting the first and second common electrode patterns 160c and 160a, which are positioned on each horizontal pixel row on the same layer, and the intersection connector 160d connected to the first common electrode pattern 160c that overlaps the data line 132 that is shifted by two pixel regions of a next horizontal pixel row may be connected to each other.

FIGS. 3, 4, and 6 and the aforementioned manufacturing method are given based on the case in which the semiconductor layer 131 and the data line 132 are formed using the same mask, but alternatively the semiconductor layer 131 and the data line 132 may be formed using respective different masks. When the same mask is used, the data line 132 and the semiconductor layer 131 (refer to FIGS. 3, 4, and 6) below a portion in which metal for forming the data line 132 is positioned may be configured, and when different masks are used, a semiconductor layer may be omitted below the data line 132. When the same mask is used, a yield may be advantageously enhanced along with increase in the number of masks, and when different masks are used, a position of a semiconductor layer may be advantageously adjusted irrespective of a data line metal layer.

The liquid crystal display device according to the present invention may include the first common electrode 110 in a plate type and the pixel electrode 150 that overlap the first common electrode 110 for in-plane switching, and simultaneously, may include the second common electrode 160 to overlap a data line to prevent light leakage on the data line 132. In this case, in the liquid crystal display device according to the present invention, the second common electrode that overlap a data line in a vertical direction may be divided into horizontal pixel row units 160a, 160b, and 160c, and an adjacent common line 133 and the intersection connector 160*d* of the second common electrode may be connected to each other, and accordingly, with regard to the second common electrode 160 (160*a*, 160*b*, and 160*c*), a common voltage value may be prevented from being changed in conjunction with a voltage applied to a data line. Accordingly, crosstalk in a vertical direction may be prevented.

To prevent light leakage around the data line 132, the first common electrode pattern 160*c* as a second common electrode may be formed to cover the data line, and the intersection connector 160*d* of the second common electrode may be configured to overlap the data line every two pixel regions between horizontal pixel rows, and thus, light leakage may be prevented, and simultaneously, stability of a common voltage may be obtained.

In addition, light leakage of the data line 132 may be prevented by configuring the first common electrode pattern 160*c* of the second common electrode 160 that covers the data line 132, and thus, the width of the black matrix 220 at a counter substrate 200 (FIG. 3) that opposes a thin film transistor array substrate 100 (FIG. 3) may be reduced, and thus, an aperture ratio may be increased. Accordingly, visibility may be enhanced.

In the liquid crystal display device according to the present invention, second common electrodes formed of a transparent conductive film in units of horizontal pixel rows and a common line that is formed of light-reflecting metal on the same layer may be connected to each other, and thus, resistance in a length direction may be lowered, and a common voltage of a second common electrode above a data line may be maintained.

Figure 7:
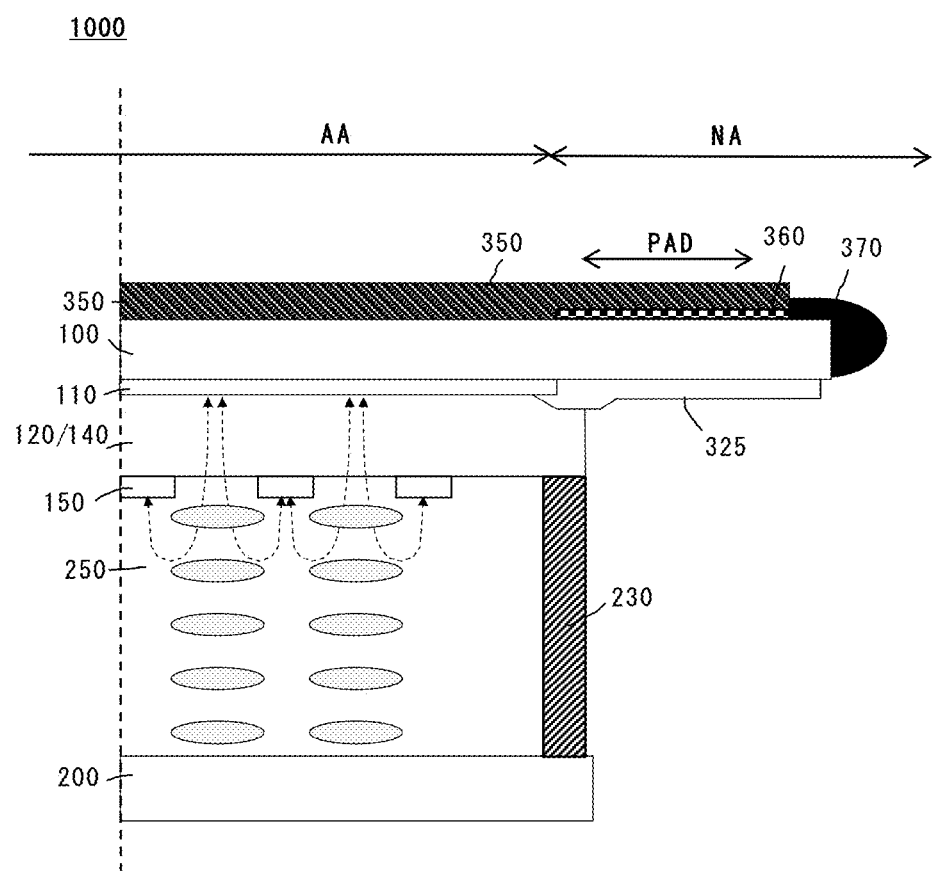
FIG. 7 is a cross-sectional view of a liquid crystal display device according to an example embodiment of the present invention.

FIG. 7 is a cross-sectional view of a liquid crystal display device according to an example embodiment of the present invention.

Referring to FIG. 7, in the liquid crystal display device according to the present invention, the first substrate 100 that has a pad portion PAD and includes a plurality of pixels on the same plane may be a substrate on which a thin film transistor array is formed and light of a liquid crystal display device 1000 is lastly emitted when light from a backlight unit (not shown) positioned below the second substrate 200 (that opposes the first substrate 100) is transmitted by the LCD device. That is, the liquid crystal display device according to the present invention may be configured in a flip type in which a panel is inverted in that the first substrate 100 with a wiring among the first and second substrates 100 and 200 is positioned toward the viewer eye.

The first and second substrates 100 and 200 may be sealed by a seal pattern 230 in a closed loop that surrounds the active area AA, and a liquid crystal layer 250 may be configured by injecting or accumulating liquid crystal in the seal pattern 230.

The liquid crystal display device 1000 according to the present invention may comply with an in-plane switching (IPS) mode in which liquid crystals are arranged in a horizontal direction when an electric field is applied for an effect of a high aperture ratio and a wide viewing angle. That is, the plate type of first common electrode 110 and the plurality of branched pixel electrodes 150 overlap each other in unit pixel, and when voltages are applied to the pixel electrode 150 and the first common electrode 110, respectively, an electric field may be generated by a voltage difference therebetween, and liquid crystals of the liquid crystal layer 250 may be arranged according to the electric field. According to an arrangement state of liquid crystals, a light transmittance amount may be changed to display an image.

In the liquid crystal display device 1000 according to the present invention, the plate type of first common electrode 110 may be formed in each of horizontal pixel rows.

As described above, the first common electrode 110 may further include the common line 133 at a different layer to be connected to the first common electrode 110, and may further include another common electrode with an electrical equipotential with the first common electrode 110 at an upper portion, as shown in FIG. 2C.

Each unit pixel may be driven by a thin film transistor (TFT) connected to a gate line (GL) and a data line (DL), and the liquid crystal display device may be driven by forming a horizontal electric field by the pixel electrode 150 to which a data voltage is applied and the first common electrode 110 to which a common voltage Vcom is applied. The insulating layer 120/140 may be disposed between the first common electrode 110 and the pixel electrode 150.

Although the liquid crystal display device according to the present invention does not include a separate electrode formed for a storage capacitor Cst, an overlap area between the pixel electrode 150 and the first common electrode 110 is large, and thus, storage capacitor capacitance Cst defined by the first common electrode 110, the pixel electrode 150, and the insulating layer therebetween in unit pixel may be sufficiently ensured.

The common electrode 110 of the active area AA and the pad electrode 325 or a common voltage application pattern of the non-active area NA may be electrically connected to each other. The liquid crystal display device according to the present invention may externally discharge static electricity generated during a process through the plate type of the first common electrode 110 that has a large area in the active area AA or static electricity generated in the first substrate 100 through the first common electrode 110 with a large area and the pad electrode 325 electrically connected thereto, or the common voltage application pattern.

The first substrate 100 may relatively protrude by an area corresponding to the pad portion PAD compared with the second substrate 200, and a flexible printed circuit board (not shown) may be connected to the pad portion PAD and may be bent below a bottom surface of the second substrate 200.

A backlight unit (not shown) may be further disposed between a portion below the second substrate 200 and the flexible circuit board.

The liquid crystal display device 1000 may further include a polarization plate 350 at a bottom surface of the first substrate 100 and may control linear polarization emitted from the bottom surface of the first substrate 100. The liquid crystal display device 1000 may further include a polarization plate (not shown) disposed on a surface on which a transparent film of the second substrate 200 is disposed.

The liquid crystal display device 1000 according to the present invention may not include a mechanism such as a top case as a borderless structure, and thus, a black ink 360 may be formed on a rear surface of the first substrate 100 to cover a pad portion which is at an end portion on an inner surface of the first substrate 100. Also, an edge of the first substrate 100 may be coated by silicon 370, and although a separate mechanism is not configured on a surface and lateral portion of the first substrate 100, visibility from the outside may be prevented. In addition, in the configuration according to the present invention, a mechanism may not be disposed, and thus, a bottom surface of the first substrate 100 may be maintained in a flat state, a step difference on visibility may be prevented, and protrusion or sense of difference at the edge may be prevented.

The liquid crystal display device 1000 may further include black printing (not shown) for hiding the non-active area NA including the pad portion PAD of the first substrate 100, and a polarization plate at a bottom surface may be disposed to cover the black printing.

The liquid crystal display device may prevent vertical crosstalk by changing a shape of a second common electrode in an active area even in a configuration in which a non-active area outside the active area is reduced by applying a borderless structure, and may include the flat type of the first common electrode 110 to increase an aperture ratio and to simultaneously prevent a disclination line between a data line and a pixel electrode adjacent thereto, thereby enhancing visibility.

The liquid crystal display device according to the present invention may have the following effects.

First, the liquid crystal display device may include a plate type of first common electrode and a pixel electrode that overlaps the first common electrode for in-plane driving, and simultaneously, may include a second common electrode to overlap a data line to prevent light leakage on the data line. In the liquid crystal display device according to the present invention, the second common electrode that overlap a data line in a vertical direction may be divided into horizontal pixel row units, and an adjacent common line and the second common electrode may be connected, and accordingly, with regard to the second common electrode, a common voltage value may be prevented from being changed in conjunction with a voltage applied to a data line. Accordingly, crosstalk in a vertical direction may be prevented.

Second, to prevent light leakage around the data line, the second common electrode may be formed to cover the data line, and the intersection connector of the second common electrode may be configured to overlap the data line every two pixel regions between horizontal pixel rows, and thus, light leakage may be prevented, and simultaneously, stability of a common voltage may be obtained.

Third, light leakage of the data line may be prevented by configuring the second common electrode that covers the data line, and thus, the width of a black matrix at a counter substrate that opposes a thin film transistor array substrate may be reduced, and thus, an aperture ratio may be increased. Accordingly, visibility may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A liquid crystal display device, comprising:
a substrate; and
a plurality of pixels arranged on the substrate, the plurality of pixels arranged in a plurality of horizontal pixel rows comprising at least a first pixel row and a second pixel row neighboring the first pixel row;
wherein:
each pixel row comprises a first common electrode;
at least one gate line is disposed between the first common electrode of the first pixel row and the first common electrode of the second pixel row;
a plurality of alternating data lines and common lines are spaced from each other and cross the at least one gate line to define the plurality of pixels in each horizontal pixel row;
each pixel comprises a plurality of pixel electrodes,
each pixel comprises a second common electrode including a first common electrode pattern and a second common electrode pattern that overlap the data line and the common line, respectively, of the pixel, and
the second common electrode of each pixel in the first pixel row is connected, through an intersection connector, to the second common electrode of a neighboring pixel in the second pixel row.

2. The liquid crystal display device of claim 1, wherein the second common electrode of a pixel in the first pixel row is symmetrical to the second common electrode of a neighboring pixel in the second pixel row in a diagonal direction with respect to the common line that passes through those pixels.

3. The liquid crystal display device of claim 2, wherein the second common electrodes of the neighboring pixels and the intersection connector are disposed on the same layer.

4. The liquid crystal display device of claim 1, wherein each pixel comprises a horizontal connector that interconnects the first and second common electrode patterns of the pixel.

5. The liquid crystal display device of claim 4, wherein the horizontal connector extends between the data line and the common line of each pixel and is positioned at only one of an upper side and a lower side of the pixel in the horizontal pixel row.

6. The liquid crystal display device of claim 1, configured to pass light through a liquid crystal layer and to emit that light through the substrate;
wherein the second common electrode of each pixel is closer to the liquid crystal layer than the data line and the common line.

7. The liquid crystal display device of claim 1, wherein the gate line is configured in one pair including a first gate line and a second gate line that are disposed between the first common electrodes of the first and second pixel rows.

8. The liquid crystal display device of claim 1, wherein the first common electrode of each pixel row is disposed at an edge of the substrate and is connected to a pad electrode at the same layer as the at least one gate line.

9. The liquid crystal display device of claim 1, wherein:
the first common electrode is disposed on the substrate;
a gate insulating layer is disposed on the first common electrode;
the data line and the common line are disposed on the gate insulating layer;
an interlayer insulating layer is disposed on the data line and the common line; and
the pixel electrode, the first common electrode pattern, and the second common electrode pattern are disposed, preferably in a same layer, on the interlayer insulating layer.

10. The liquid crystal display device of claim 9, further comprising a semiconductor layer on the gate insulating layer.

11. The liquid crystal display device of claim 10, wherein the data line and the common line are disposed, preferably in a same layer, on the semiconductor layer.

12. The liquid crystal display device of claim 1, wherein the first common electrode has a plate shape, and the pixel electrode has a finger shape.

13. The liquid crystal display device of claim 1, wherein the second common electrode pattern is electrically connected to the common line.

14. The liquid crystal display device of claim 4, wherein the first and second common electrode patterns, the horizontal connector, and the intersection connector are disposed on the same layer.

15. The liquid crystal display device of claim 1, wherein the at least one gate line and the first common electrode are disposed, preferably in a same layer, on the substrate.

* * * * *